(No Model.)

H. W. POPE.
GROUND WIRE CLAMP FOR TELEGRAPH LINES.

No. 283,140.  Patented Aug. 14, 1883.

Witnesses;
Mrs. K. Lockwood French
Miller O'Carl

Inventor;
Henry W. Pope,
by his Attorney,
Frank L. Pope

UNITED STATES PATENT OFFICE.

HENRY W. POPE, OF ELIZABETH, NEW JERSEY.

GROUND-WIRE CLAMP FOR TELEGRAPH-LINES.

SPECIFICATION forming part of Letters Patent No. 283,140, dated August 14, 1883.

Application filed May 21, 1881. (No model.)

*To all whom it may concern:*

Be it known that I, HENRY W. POPE, a citizen of the United States, residing at Elizabeth, in the county of Union and State of New Jersey, have invented a new and useful Ground-Wire Clamp for Telegraphic Lines, of which the following is a specification.

In case the earth is used as a return-conductor for a telegraphic, telephonic, or other line of electrical communication, it is necessary to form a good conducting connection at each end of such line between its terminal and the earth. The most convenient and effectual method of doing this is to attach the end of the wire which forms the terminal of the line to a gas or water pipe usually within the building in which the terminal station is situated. These pipes, forming, as they do, branches of a very extensive system of pipes beneath the ground, and thus exposing an enormous conducting surface of metal to the earth, form the best possible means of effecting an electrical connection therewith. When gas or water pipes are not available, a cylindrical pointed iron rod is frequently made use of, which is driven vertically into the earth to a sufficient depth. The most usual method of attaching the conducting-wire to such cylindrical pipes or rods heretofore employed has been to wind or wrap the wire many times around the pipe or rod and as closely as possible, and then to secure the same by soldering it to the pipe. This process of soldering is also essential in order to secure good conducting connection between the wire and the pipe, and, while practically a very effectual method, is expensive, and is, moreover, very inconvenient, for the reason that such pipes are usually continuous and are placed closely against a wall, or in a confined space within the partitions and floors of buildings, so that the coiling of the wire in this manner around the pipe can frequently be effected only with great difficulty, and in some cases not at all.

The object of my invention is to provide a simple, cheap, and effectual device for attaching conducting-wires to such cylindrical pipes or rods, which form an efficient conducting-connection therewith, and which may be applied in any position or under any circumstances, and removed without difficulty when necessary.

Figure 1:
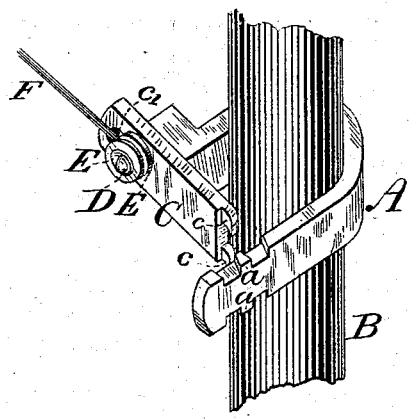
Figure 2:
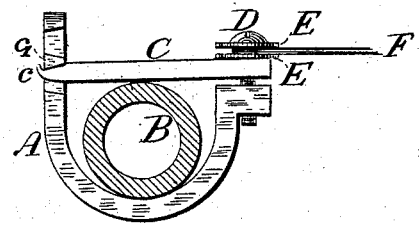

In the accompanying drawings, Figure 1 is a perspective view of a device embodying my invention and illustrating the same as applied to a pipe or rod. Fig. 2 is a plan view of the same.

Referring to Figs. 1 and 2, A is the body of the clamp, which is preferably made of cast metal—such as brass, for example—and is provided with a curved inner surface adapted to fit the cylindrical pipe B and expose a considerable surface to metallic contact therewith in order to form an efficient electrical connection.

C is a metallic bar, which is formed into a hook or hooks, $c$, at one end to enable it to take hold of corresponding projections, $a$, which are formed upon one end of the curved portion of the clamp A, and thus form a hinge, while its other extremity has a slot, $c'$, through which passes a screw, D, the latter being fitted into a corresponding screw-hole in the other end of the clamp A. The screw D also passes loosely through two annular metallic washers, E E.

The device thus described is applied as follows: The end of the conducting-wire F, which forms the terminal of a telegraphic, telephonic, or other line of electrical communication, is bent into a loop, which is placed between the metallic washers E E. The bar C is then moved back, so as to disengage the hooks $c$ from the projections $a$—a motion which is permitted by the slot $c$. The bar C is then swung round sidewise upon the screw D as a pivot, so as to admit of the curved portion A of the clamp being placed in contact with the pipe B. The bar is then replaced, so that the hooks $c$ engage with the projections A, and finally the screw D is screwed up tightly, thus causing the bar C and clamp A to grasp the pipe B with considerable force, while at the same time the connecting-wire F is clamped between the washers E E, and thus a complete metallic conducting-connection is formed between the wire F and the pipe B.

It may be preferable in some cases, instead of making use of a binding-screw, to solder a short piece of wire to the body of the clamp, and to connect this short piece of wire with the conducting-wire by splicing or twisting the ends together in a well-known manner.

In order to secure a perfect metallic connection between the clamp and the pipe or rod to which it is attached, the outer surface of the pipe or rod and the inner surface of the clamp should be brightened by rubbing them with a file or emery-paper before putting them together.

The device hereinbefore described may with advantage be constructed of a number of different sizes corresponding to the regular commercial sizes of gas and water pipe.

I am aware that clamps somewhat similar to mine have long been used for certain purposes, such as uniting the ends of wires or other cylindrical electric conductors, and for attaching such conductors to battery-plates, or to the rectangular arms projecting from such plates. My invention differs from the first of these in respect to the conformation of the clamp, whereby it may be made to embrace a continuous pipe or rod, and can be placed sidewise upon it at any point required. It also differs from the battery-clamp, in that its inner surface is curved and shaped to fit the cylindrical pipe or rod, instead of presenting a plane surface thereto, which would be objectionable for the reason that it could not be fastened securely to a cylindrical surface; and, moreover, when brought in contact with such a surface it would not produce a sufficient area of superficial contact to secure an efficient conduction of electricity between the clamp and the pipe or rod.

I claim as my invention—

The combination, substantially as hereinbefore set forth, of a metallic clamp formed in two parts hinged or interlocked together and adapted to embrace a cylindrical pipe or rod, a screw for binding the free ends of the clamp together, and an electrical conductor attached to or connected with said clamp.

In testimony whereof I have hereunto subscribed my name this 20th day of May, A. D. 1881.

HENRY W. POPE.

Witnesses:
WILLIAM H. KENYON,
MILLER C. EARL.